W. F. WELCH.
LAWN MOWER.
APPLICATION FILED SEPT. 8, 1919.
1,366,440.
Patented Jan. 25, 1921.
7 SHEETS—SHEET 4.
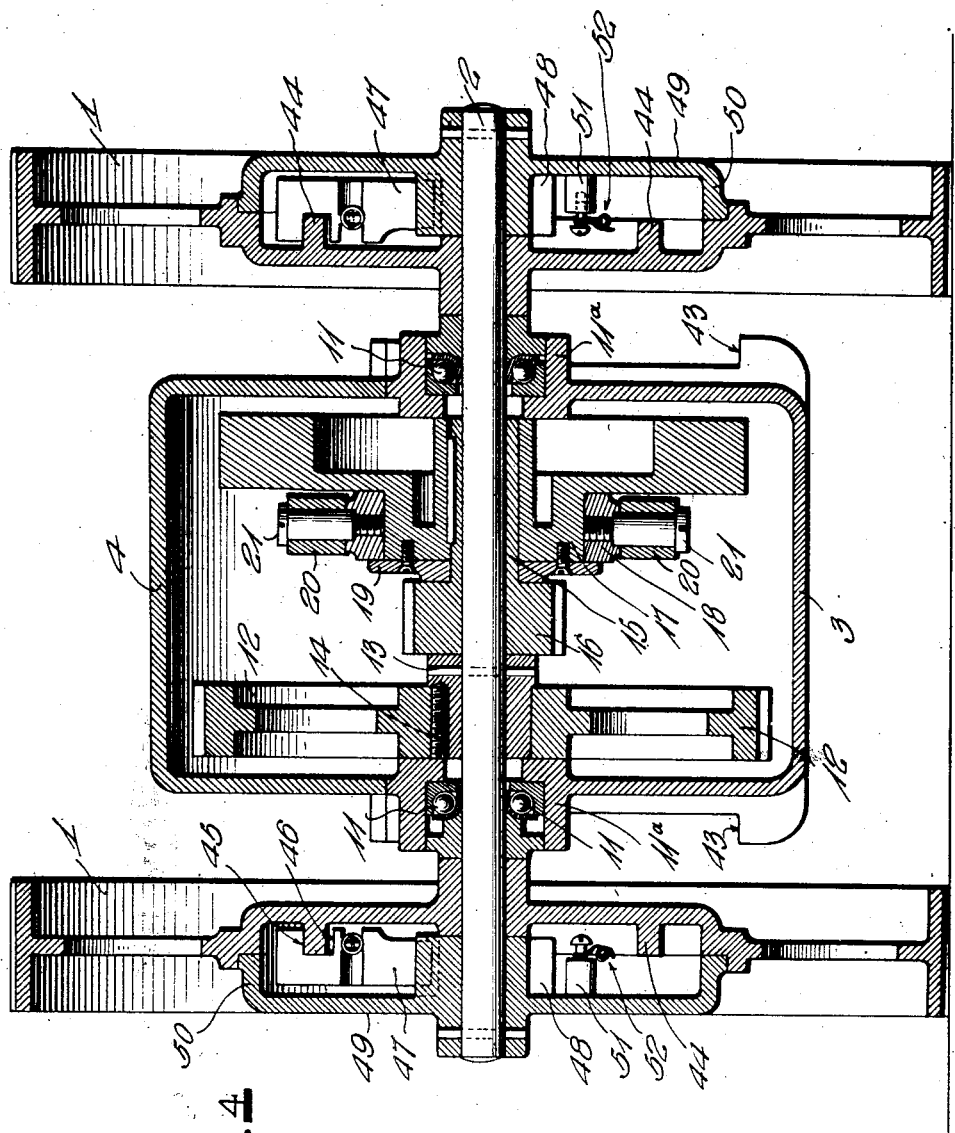
Inventor
Walter F. Welch

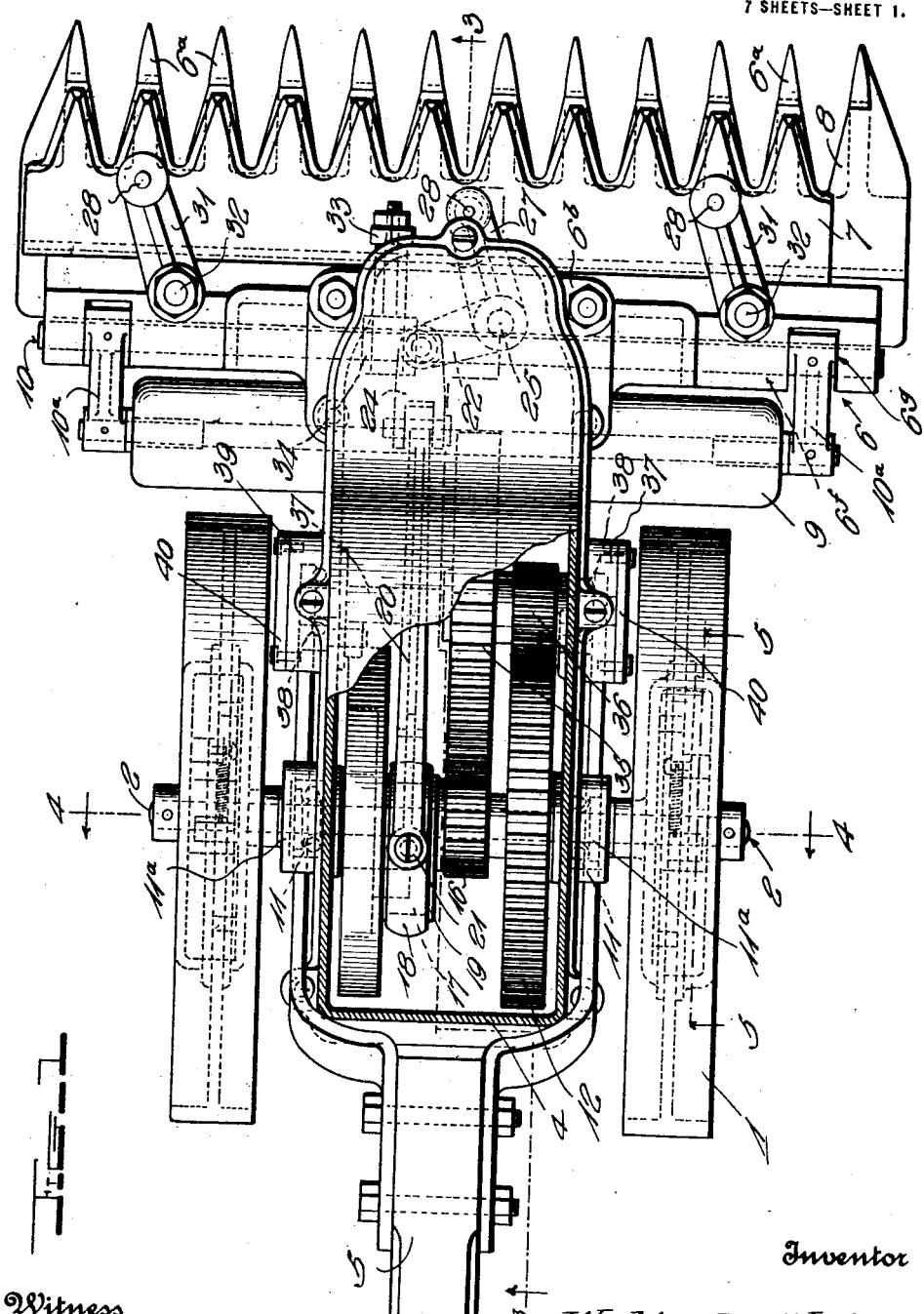

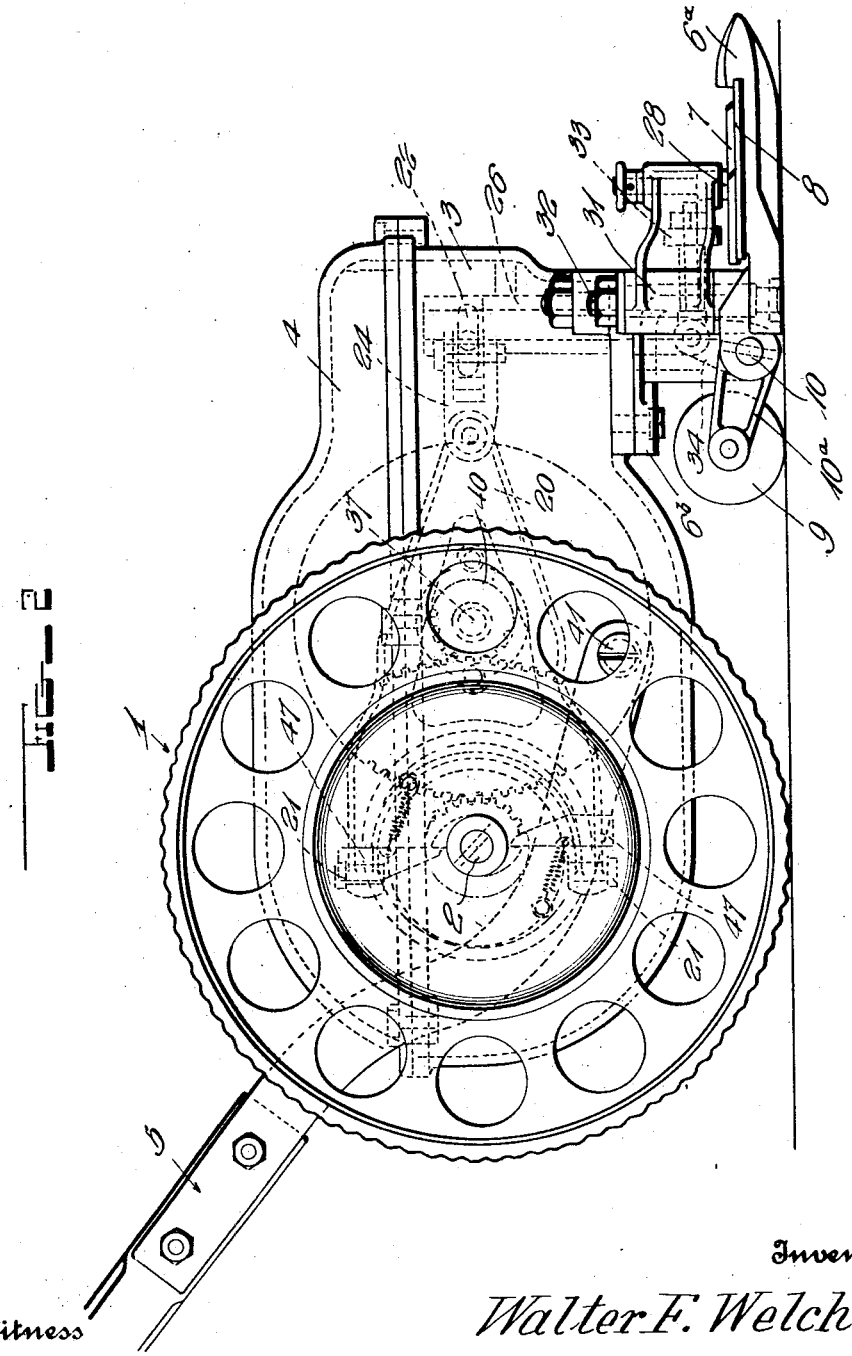

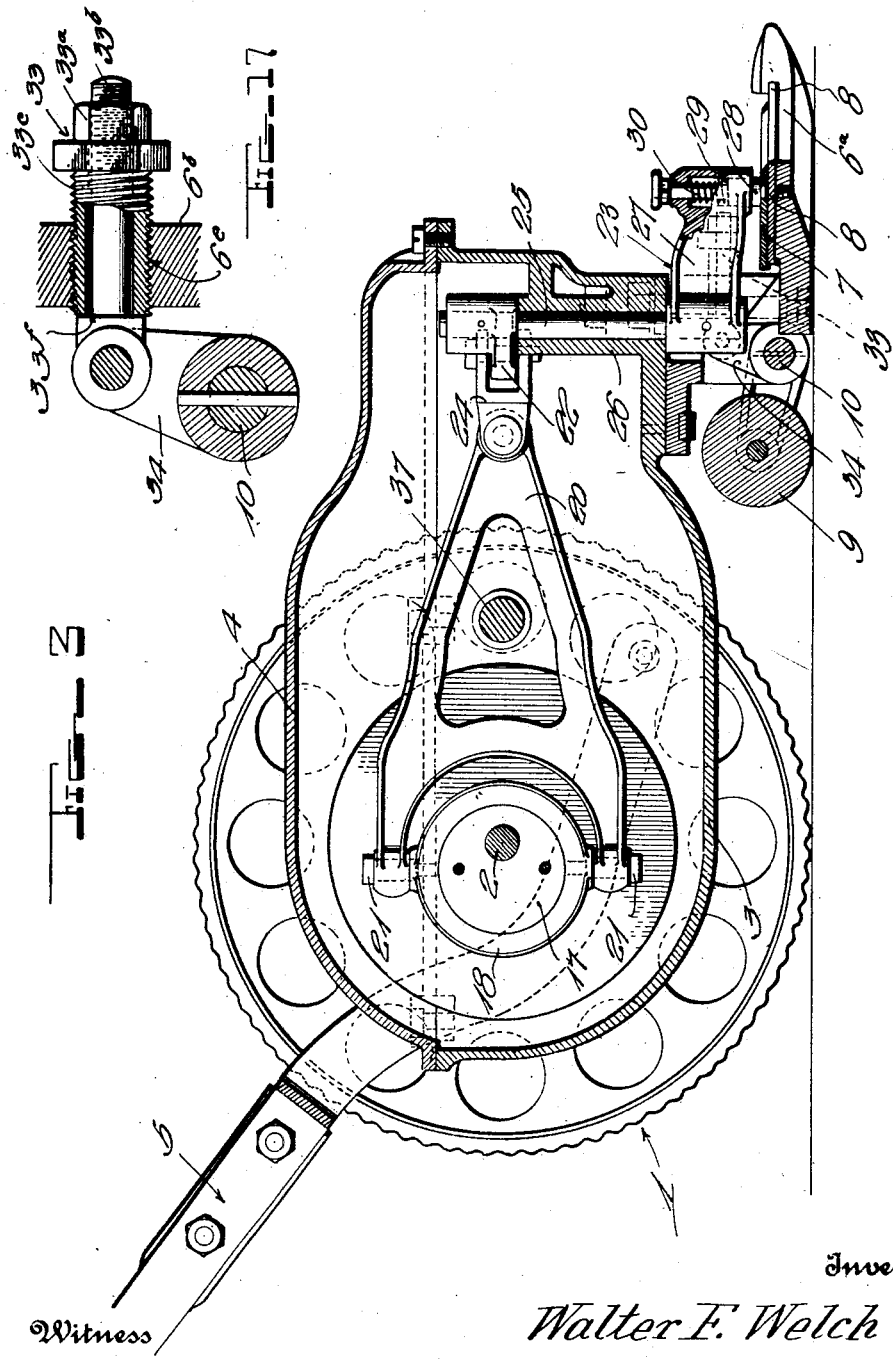

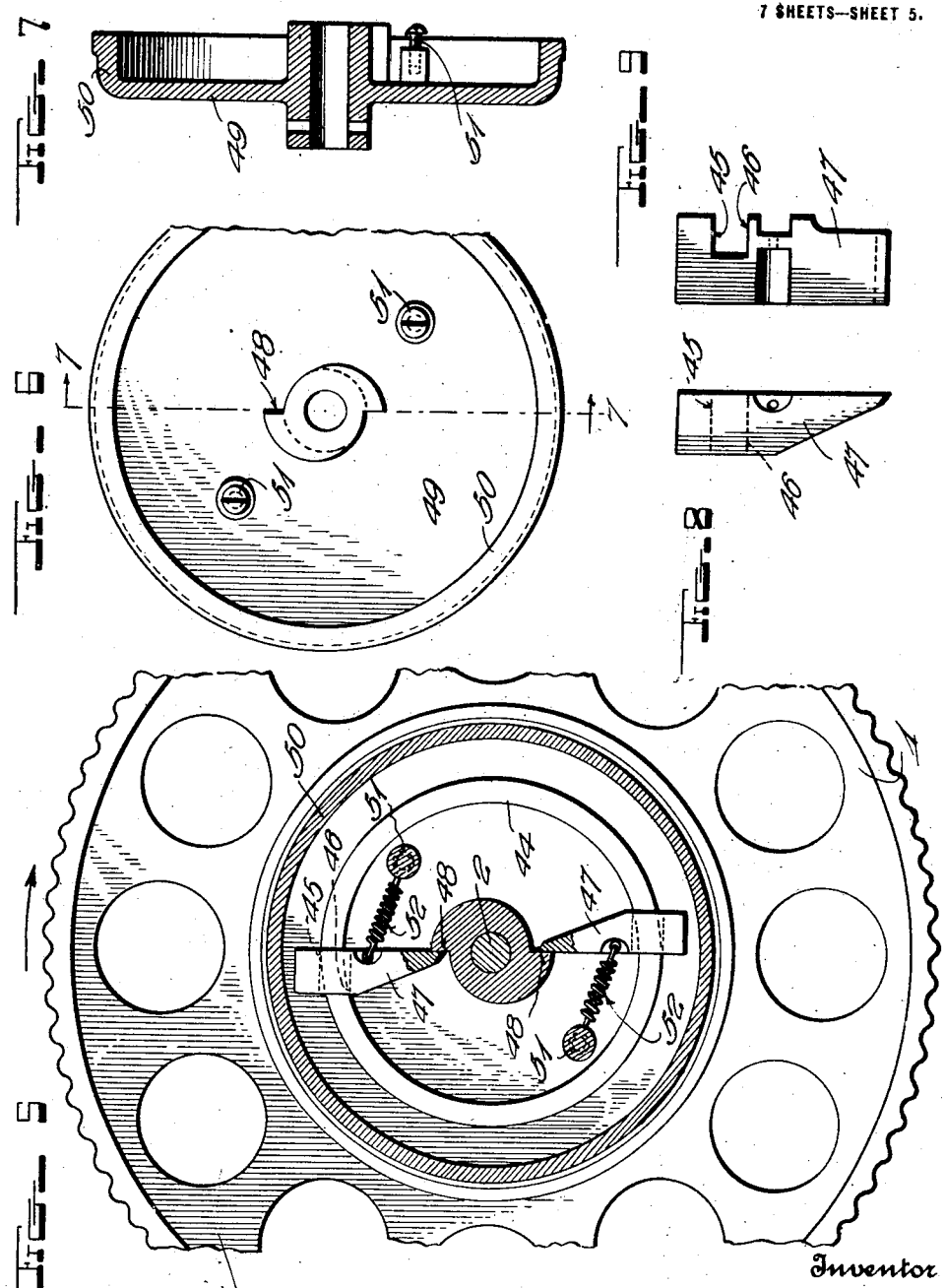

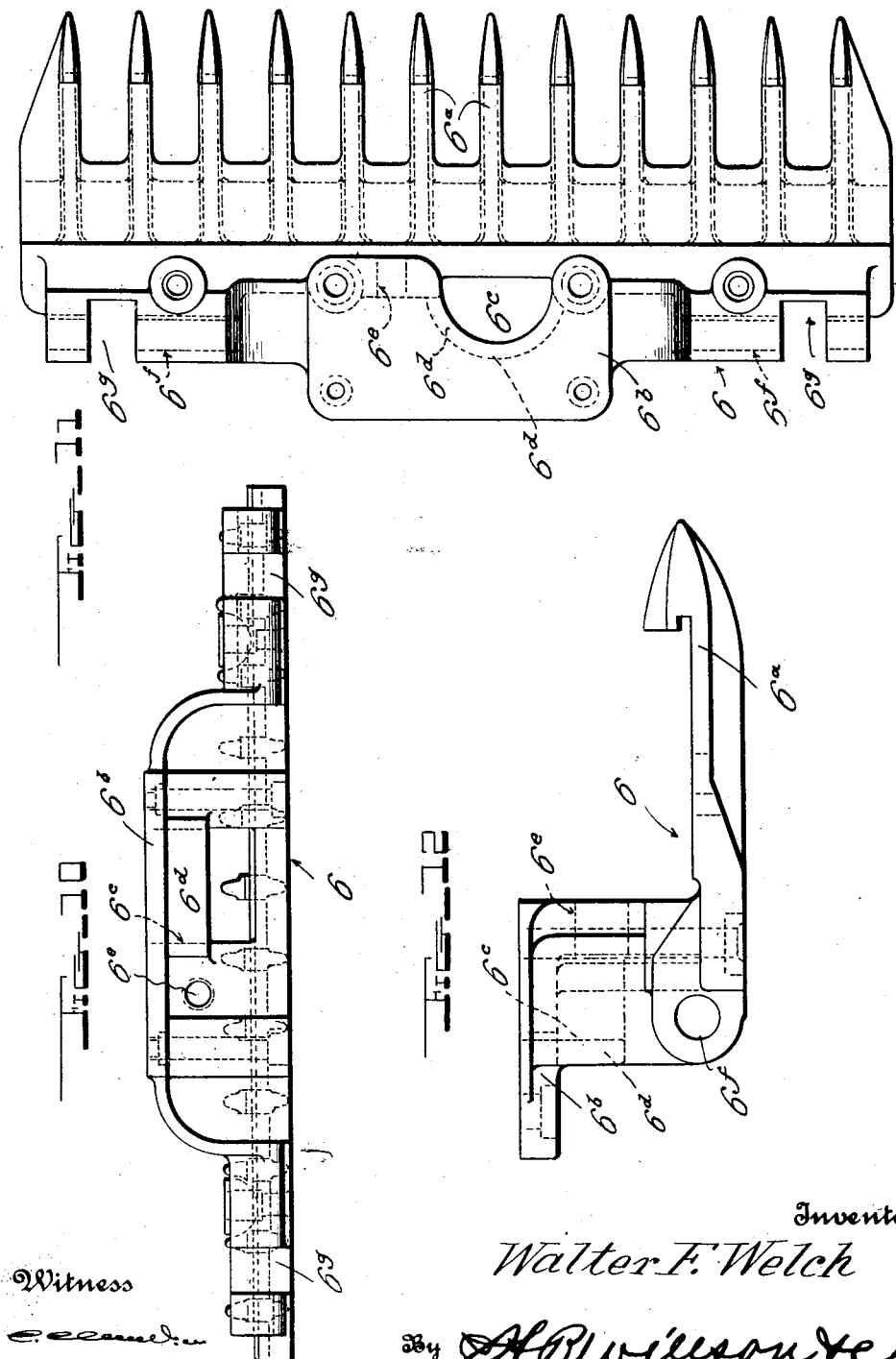

W. F. WELCH.
LAWN MOWER.
APPLICATION FILED SEPT. 8, 1919.
1,366,440.
Patented Jan. 25, 1921.
7 SHEETS—SHEET 7.
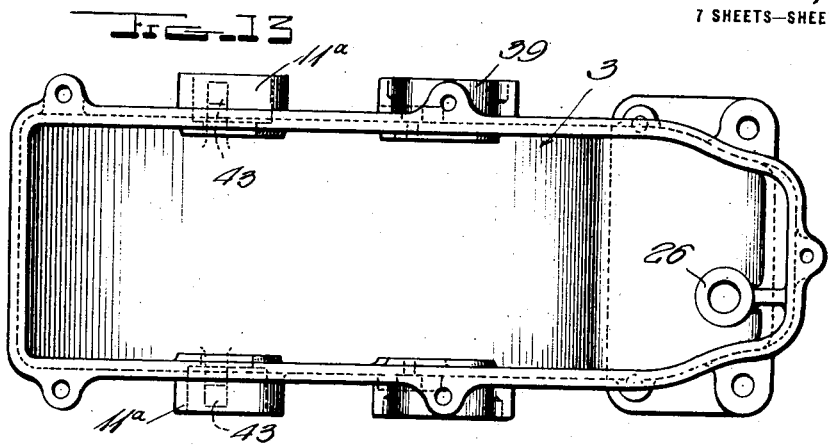
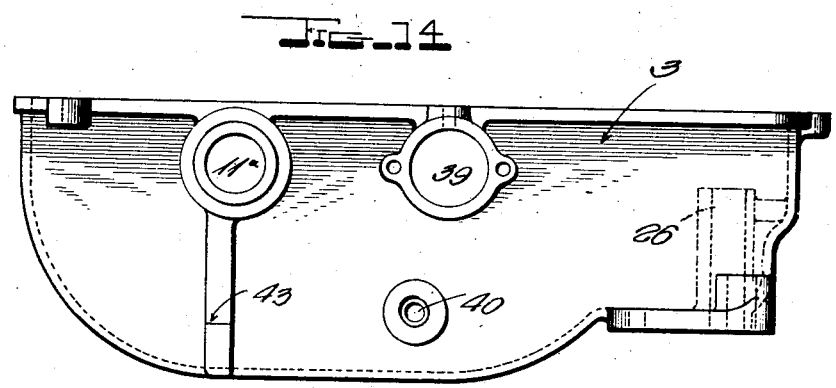
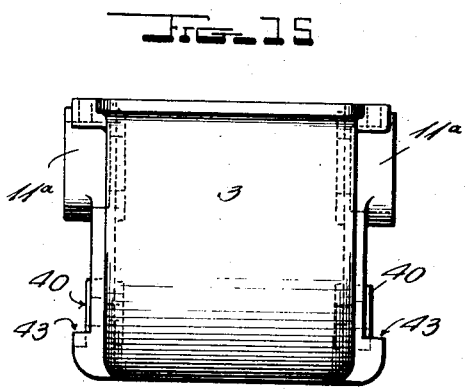
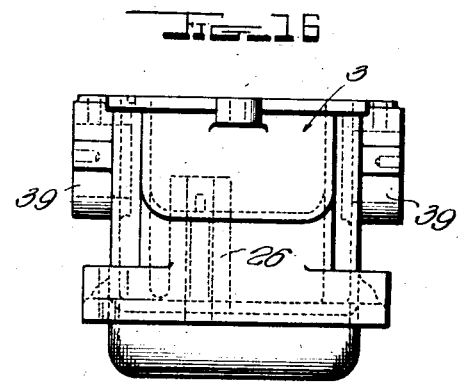
Inventor
Walter F. Welch
Witness

UNITED STATES PATENT OFFICE.

WALTER F. WELCH, OF JAMAICA, NEW YORK.

LAWN-MOWER.

1,366,440.  Specification of Letters Patent.  Patented Jan. 25, 1921.

Application filed September 8, 1919. Serial No. 322,359.

*To all whom it may concern:*

Be it known that I, WALTER F. WELCH, a citizen of the United States, residing at Jamaica, in the county of Queens and State of New York, have invented certain new and useful Improvements in Lawn-Mowers; and I do declare the following to be a full, clear, and exact description of the invention, such as will enable others skilled in the art to which it appertains to make and use the same.

This invention relates to lawn mowers.

One object of this invention is to generally improve upon devices of this character by providing an improved structure which is exceedingly compact, strong, durable and efficient, and in which a reciprocating knife is employed and may be very quickly and easily detached for sharpening.

A further object of the invention is to provide an improved noiseless clutch mechanism for each of the ground-wheels, these clutch mechanisms being very durable and very effective in their operation.

Other objects and advantages may become apparent to persons who read the following details of description in connection with the accompanying drawings in which, Figure 1 is a top plan view, a portion of the gear casing being broken away to disclose the gearing or transmission means which transmits motion from the ground-wheels to the knife, the handle also being broken away.

Fig. 2 is a right side elevation of the machine, the handle being broken off.

Fig. 3 is a vertical sectional view along the line 3—3 of Fig. 1.

Fig. 4 is a transverse sectional view along the line 4—4 of Fig. 1.

Fig. 5 is an enlarged vertical sectional detail, the section being taken along the line 5—5 of Fig. 1.

Fig. 6 is a detail view illustrating the clutch-housing which is shown in section in Fig. 5.

Fig. 7 is a sectional view along the line 7—7 of Fig. 6.

Fig. 8 is a side elevation of one of the clutch members detached.

Fig. 9 is a front elevation of the clutch member shown in Fig. 8.

Fig. 10 is a rear elevation of a casting or integral structure including the cutter-bar and an arch or bridge which is attachable to the bottom of the main gear casing.

Fig. 11 is a top plan view of the member shown in Fig. 10.

Fig. 12 is a left end elevation of the members shown in Figs. 10 and 11.

Fig. 13 is a top plan view of the lower section of the main gear casing.

Fig. 14 is a side elevation of the member shown in Fig. 13.

Figs. 15 and 16 are end elevations of the members shown in Figs. 13 and 14.

Fig. 17 is an enlarged sectional view illustrating the details of the roller-adjusting mechanism.

Referring to these drawings in detail, in which similar reference characters correspond with similar parts throughout the several views, and having special reference to Figs. 1, 3 and 4, it will be seen that the device comprises broadly a pair of ground-wheels 1, a main axle 2 supported by the ground-wheels, a main gear casing consisting of a lower section 3 and an upper section or cover 4, a bifurcated handle generally indicated by the numeral 5, a cutter-bar-frame generally indicated by the numeral 6 in Figs. 1, 10, 11 and 12, a knife 7, a cutter plate 8, a roller 9, a roller-adjusting means including a shaft 10, and transmission mechanism which will now be described in detail as follows:

Referring now to Fig. 4, it will be seen that the ground-wheels 1 are mounted to rotate freely in one direction on the shaft 2, but are held against rotation in the opposite direction by an improved clutch mechanism (which will later be described in detail), and therefore, when the machine is pushed forward so as to rotate the ground-wheels, the clutch mechanism also causes the shaft 2 to rotate with the ground-wheels. The shaft 2 is journaled in bearings 11 in the opposite vertical walls of the main gear casing, ball-bearings being preferably though not essentially employed. A main driving gear-wheel 12 is keyed to a hub 13 by means of a screw 14, and this hub is keyed to the main shaft 2, so that the wheel 12 is rigid with the shaft 2 and rotates therewith. A tubular member 15 is mounted to rotate freely on the shaft 2 and consists of a spur pinion 16 and a cylindrical seat for a disk or combined fly-wheel and eccentric member 17, the member 17 being keyed to and rotatable with the spur pinion 16. An annulus 18 is journaled on the eccentric disk of the member 17, and a retaining plate 19 is secured to the member 17 and extends beyond the bearing surface of the eccentric disk so as to retain the annulus on the disk. A bifurcated link 20 (see Fig. 3) straddles the annulus 18 and is pivotally connected to diametrically opposite sides thereof by means of pivot screws 21. The other end of this link 20 is connected to the upper arm 22, of a lever generally indicated at 23 in Fig. 3, through the medium of a link 24. A shaft 25 is journaled in a vertical bearing 26 and constitutes the fulcrum portion of the lever 23. The lower arm 27 of the lever 23 extends below the bottom of the main gear casing and connects with the knife 7 through the medium of a spring-pressed plunger 28, this plunger being formed with a shoulder 29 on which a spring 30 is seated. The plunger and spring are seated in a shouldered aperture of the arm 27, and the plunger is provided with a head or knob which may be engaged by the fingers of a person for raising the plunger out of engagement with its bearing in the knife 7. It will be understood that the plunger 28 normally forms a pivotal connection with the knife 7, and that the knife is reciprocated by the rocking or oscillating movement of the lever 23, this oscillating movement of the lever being effected by the coöperation of the links 20 and 24 with the eccentric rotary disk 17 and annulus 18. The link 24 is relatively short so that it and its pivotal connections combine to form a universal joint between and alined with arm 24 and annulus 18.

Referring now to Fig. 1, it will be seen that the knife 7 is held in the proper relation to the cutter-bar by means of links 31 which are pivotally connected to the knife by means of spring-pressed plungers 28 similar to those which have previously been described in connection with the lever 23, the rear ends of the links 31 being pivotally connected to the cutter-bar-frame 6 by means of pivots or studs 32. From the foregoing description, it will be seen that the knife 7 does not reciprocate in a straight line, but moves in the arc of a circle; or in other words, each point of the knife 7 moves in the arc of a circle having its center in the axial plane of the shaft 25, and therefore, the cutting efficiency of the knife is greater than that of a knife that moves exactly in a straight line.

Referring now especially to Figs. 10 and 11, it will be seen that the cutter-bar-frame 6 comprises a cutter-bar having teeth 6$^a$, a bridge 6$^b$ having apertures therein through which bolts extend into engagement with a lower casing section as indicated in Figs. 1, 2 and 3. The bridge is recessed at 6$^c$ and its supporting wall is provided with a continuation of this recess to permit the lever 23 to extend approximately down to the cutter-bar, and the bridge 6$^b$ is reinforced at the recess 6$^c$ by means of a depending flange 6$^d$. Moreover, the bridge wall is apertured and screw-threaded at 6$^e$ for the reception of the screw-threaded adjusting device indicated at 33, in Figs. 1 and 2. The cutter-bar-frame, including the teeth 6$^a$ and bridge 6$^b$, is preferably formed integrally of a single casting, and its rear end is bored as indicated at 6$^f$ to provide a bearing for the shaft 10. Moreover, the rear end of the member 6 is recessed at 6$^g$ to receive arms 10$^a$ which connect the roller 9 with the shaft 10. An arm 34 is secured to the shaft 10 and pivotally connected to the screw-threaded adjusting device 33. By proper manipulation of the adjusting device 33, the shaft 10 is turned in its bearing, and the roller 9 is raised or lowered with relation to the cutter-bar-frame, so as to raise or lower the latter with relation to the ground and thereby regulate the height to which the grass is cut.

In addition to the gearing which has previously been described in connection with the shaft 2, the gear casing contains a gear-wheel 35 and a gear pinion 36, the latter being in mesh with the driving gear-wheel 12, while the gear-wheel 35 is in mesh with the pinion 16 which is loosely mounted on the shaft 2 and carries the eccentric disk 17. The wheels 35 and 36 are keyed on a shaft 37 which is rotatable in ball-bearings indicated at 38 in Fig. 1, the lower section of the main gear casing being provided with bearing seats indicated at 39 in Figs. 1, 13, 14 and 16. Caps or cover plates 40 are removably secured to the bearing seats 39 so that easy access may be had to the bearing 38 for lubricating the same. Bearing seats for the bearings 11 are indicated at 11$^a$ in Figs. 13-15.

The bifurcated link or connecting member 20 has an opening therethrough of sufficient size to permit the shaft 37 to extend therethrough without interfering with the operation of this link.

Referring again to the lower casing section, (Figs. 13-16) it will be seen that bearings 40 are provided to receive pivot elements which connect the bifurcated handle 5 to the gear casing as indicated at 41 in Fig. 2. Moreover, shoulders 43 are provided on the gear casing, as indicated in Figs. 4, 14 and 15, for limiting the downward movement of the handle with relation to the gear casing, thereby enabling the operator to raise the cutter-bar by lowering the rear end of the handle. The upward movement of the handle-bar is limited by its contact with the bearing seats 11$^a$.

The upper section 4 of the gear casing is removably secured to the lower section 3 by screws or other appropriate means so that easy access may be had to the transmission gearing for lubricating the same. It will be seen that the upper end of the bearing 26 extends substantially to the level of the bearing seats 11ª and 39, and there is no perforation or joint below these several bearing seats, and therefore, the lower part of this section of the gear casing provides an impervious basin which may be kept approximately full of lubricating material without danger of leakage, and this lubricating material is continually carried up and distributed through the transmission mechanism during operation of the machine, so that the minimum attention is required, the minimum inconvenience is experienced in lubricating and repairing the machine, and the maximum efficiency and durability is obtained.

Before explaining the operation of the device, the ratchet mechanism in the driving wheels or ground-wheels 1 will be explained as follows:

Referring to Figs. 4 to 9 inclusive, it will be seen that each wheel 1 is provided with an annular rib 44 having cylindrical inner and outer surfaces which are frictionally engaged by shoulders 45 and 46 of a clutch member 47. Two of such clutch members are employed in the present instance, although one would operate independently of the other, and more than two of such members may be employed. However, the description will be confined to one of these clutch members 47 in connection with the annulus 44 and a shoulder 48 which is formed integrally or rigidly with a disk or clutch casing 49 which has an annular closing flange 50 and is provided with studs 51 to which a spring 52 is anchored, the other end of the spring 52 being connected to the clutch member 47 so that it pulls the shoulders 45 and 46 into frictional engagement with the annulus 44. As the wheel 1 rotates in the direction of the arrow at the top of Fig. 5, the annulus 44 operates through this frictional engagement to pull the inner end of the member 47 with greater force against the shoulder 48 so as to cause the disk 49 to rotate with the wheel 1 and thus rotate the shaft 2 which is rigid with the disk 49. The increased pressure of the member 47 against the shoulder 48 increases the friction between the shoulders 45 and 46 with the annulus 44, so that there can be no relative movement of the wheel 1 and disk 49 while the wheel rotates in this direction. However, in case the wheel stops while the shaft 2 continues to rotate, or the wheel 1 rotates faster than the shaft 2, the annulus 44 slips freely and easily through the space between the shoulders 45 and 46.

The operation of the device is as follows:

As the wheels 1 turn forward in the manner just previously described, the shaft 2 and driving wheel 12 are rotated therewith in the same direction. The wheel 12 causes the pinion 36 to rotate in the opposite direction and carry the shaft 37 and wheel 35 therewith. The wheel 35 effects rotation of the pinion 16 and disk 17, and this disk effects reciprocatory or gyrating movement of the bifurcated link 20. This link transmits its movement to the lever 23 through the medium of the link 24, and the lever 23 transmits a reciprocatory or somewhat circular movement to the knife 7. The springs 30 hold the knife 7 down against the upper surface of the stationary knife or cutter plate so that the coöperating edges of these two plates effect their function very efficiently, but permit the knife to be raised with relation to the plate 8 when undue pressure is exerted as by an unusually hard or tough object being encountered. It will be understood as previously suggested, that each of the plungers 28 is provided with a spring 30, and each of these plungers coöperate with springs for holding the knife against the plate 8.

When it is desired to raise or lower the cutter-bar by adjusting the roller 9, a nut 33ª on a bolt 33ᵇ is loosened to permit the member 33ᶜ to be turned in the threaded aperture 6ᵉ. When proper adjustment has been made, the nut 33ᵇ is tightened against the polygonal outer end of the member 33ᶜ and clamps the latter between the nut 33ª and a shoulder 33ᶠ of the bolt 33ᵇ to hold the parts in adjusted position.

Although I have described this embodiment of my invention very specifically, it is not intended to limit this invention to these exact details of construction and arrangement, but changes may be made within the scope of the inventive ideas as implied and claimed.

What I claim as my invention is:

1. In a lawn mower, a main supporting and driving axle, ground-wheels axially alined with and united with said main axle and operable to rotate the latter, a disk mounted eccentrically on said main axle, an annulus journaled on said disk, a cutting device including a reciprocatory knife, a frame connecting said cutting device with said main axle and having a vertical bearing in its front portion, an oscillatory shaft in said vertical bearing, an arm carried by said oscillatory shaft and operatively connected to said knife for reciprocating the latter, a second arm on said oscillatory shaft and being substantially level with said main axle, a link pivotally connected to said second arm, and a link pivotally connected to the first said link and to said annulus, the pivotal connection between the first and second said links being substantially in the same horizontal plane with said main shaft and said second arm.

2. In a lawn mower, a main supporting and driving axle, ground-wheels axially alined with and united with said main axle and operable to rotate the latter, a hollow frame including an impervious basin and also including a vertical bearing at its front end, the rear portion of said hollow frame being provided with horizontal bearings in which said main axle is journaled, said horizontal bearings and the top of said vertical bearings being substantially in the same horizontal plane, a cutting device secured to and extending forward from the lower front end of said hollow frame, a shaft journaled in said vertical bearing, a lower arm united with the lower end of said shaft and extending forwardly over said cutting device, means in said hollow-frame operatively connecting said arm to said cutting device for operating the latter, an upper arm on said shaft at the upper end of said vertical bearing, and means operatively connecting said main axle with said upper arm for actuating said shaft and lower arm, for the purpose specified.

3. In a lawn-mower, a ground-wheel, an eccentric disk rotatable by said ground-wheel, an annulus journaled on said disk, a cutter-bar, a knife mounted for reciprocation on said cutter-bar, a lever pivotally connected to said knife and having its fulcrum fixed with relation to the axis of said disk, a link pivotally connected to an arm of said lever, and a link having a bifurcated end straddling said disk and pivotally connected thereto at diametrically opposite points, said bifurcated link having its other end pivotally connected to the first said link.

4. In a mower, a cutter-bar, a knife mounted to reciprocate on said cutter-bar, a lever, means to oscillate said lever, and a spring-pressed plunger carried by an arm of said lever and normally held by its spring in pivotal engagement with said knife.

5. In a lawn-mower, a ground-wheel, a main driving shaft coaxial with and rotatable by the ground-wheel, a disk mounted eccentrically on said driving shaft, transmission means driven by said driving shaft and operable to rotate said disk at a higher speed than that of the ground-wheel, an annulus in which said disk is journaled, a bifurcated link straddling said annulus and pivotally connected to diametrically opposite sides of the latter, a reciprocatory knife, and transmission means connecting said bifurcated link to said knife in such relation that the latter is reciprocated by the rotation of said disk.

6. In a lawn-mower a gear-casing having horizontally alined bearings in opposite sides and a vertical bearing in its front end, a main driving shaft rotatable in said horizontally alined bearings, ground-wheels connected to said main driving shaft for carrying and rotating the latter, a vertical shaft mounted to rock in said vertical bearing and extending below the bottom of said gear-casing, an integral frame comprising a cutter-bar and a bridge, said bridge extending up from the cutter-bar and secured to the bottom of said gear-casing and being recessed to receive the lower end of said vertical shaft, a knife on said cutter-bar, means including gearing in said gear-casing to oscillate said vertical shaft, and means under the gear-casing operatable by said vertical shaft to reciprocate said knife.

7. In a mower, a cutter-bar, a knife mounted to reciprocate on said cutter-bar, a lever, means to oscillate said lever, a spring-pressed plunger carried by an arm of said lever and normally held by its spring in pivotal engagement with said knife, and a link mounted to swing about an axis which is fixed with relation to the fulcrum of said lever and is provided with a pivot which is removably engaged with said knife.

8. A lawn-mower mechanism comprising a cutter-bar, a bridge thereon to secure this mechanism to a gear-casing, a shaft mounted to rock at the rear of said cutter-bar, arms extending rearward from the end portions of said shaft, a roller carried by said arms, an arm extending up from said shaft, and screw-threaded means adjustably secured in said bridge and pivoted to said upwardly extending arm to raise and lower the roller with relation to said cutter-bar.

9. In a lawn mower, a cutter-bar-frame including a cutter-bar and a wall, this wall being provided with a screw-threaded aperture therethrough, a roller behind said wall, a rock-shaft between said wall and roller, arms on and extending rearward of said rock-shaft and having said roller mounted thereon, an adjusting arm on and extending up from said rock-shaft, and a bolt provided with a nut on its front end and having its rear end pivoted to said arm, a tubular screw fitted in the screw threaded aperture of said wall and having said bolt extending therethrough and being operable to adjust said bolt longitudinally and thereby to coact with said shaft and said arm for adjusting said shaft about its axis, said bolt and nut being adapted to clamp the tubular screw and hold it in different adjusted positions.

In testimony whereof I have hereunto set my hand.

WALTER F. WELCH.